April 4, 1950     H. W. EGGERING     2,502,836

TRAP

Filed April 13, 1949

INVENTOR
HENRY W. EGGERING
BY *J. G. Cook*
ATTORNEY

Patented Apr. 4, 1950

2,502,836

UNITED STATES PATENT OFFICE 2,502,836

TRAP

Henry W. Eggering, St. Louis, Mo.

Application April 13, 1949, Serial No. 87,337

2 Claims. (Cl. 43—61)

This invention relates to traps, primarily for rats and other rodents, its principal object being the production of a trap in which the cover will be held open by the setting of the trap and closed by the entrance of an animal, and in which the lid will be tightly held against opening by the trapped animal. Another object is to provide a trap which is more durable than the ordinary wire mesh trap commonly used, with all of its parts capable of long service with ordinary usage.

In the drawings

Figure 1:
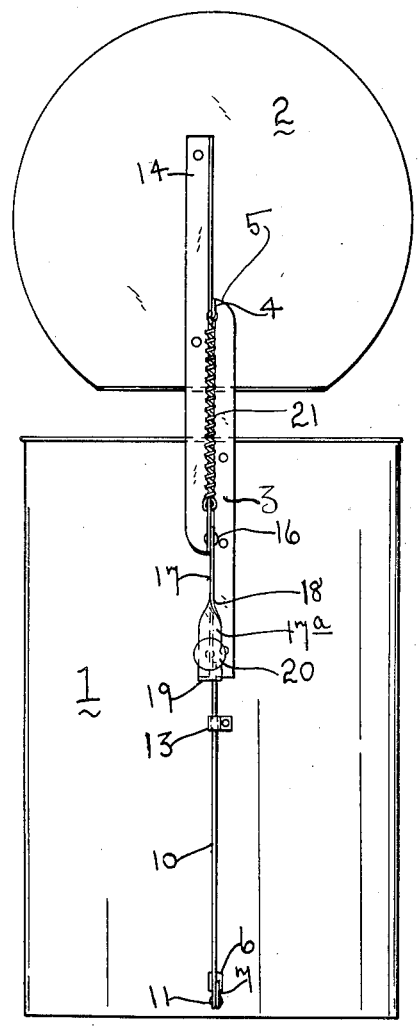
Fig. 1 is a front elevation of my trap showing it in set position.

The invention comprises a metal receptacle, which is illustrated in the drawing as being circular but may be of any preferred shape. The receptacle has a wall 1 and a cover 2 which conforms in shape to the shape of the receptacle. To the outer surface of the wall 1 I secure rigidly a metal member having right angle flanges 3 and 4, respectively, the flange 3 being secured to the wall 1 and the flange 4 extending outwardly therefrom, said flanged member extending from a point approximately midway of the wall 1 to a point somewhat above said wall. Near the bottom of the receptacle the wall 1 is provided with a longitudinal slit 6 at a point below the flanged member 3—4.

A rockable lever 7 passes through the slit 6, said lever being in the form of a flat metal strip and provided with a cutout 8 which fits loosely upon the wall 1 at the lower portion of the slit 6 and is rockable thereon. The lever 7 is of such length as to extend almost but not entirely across the receptacle and outwardly beyond the wall 1, and a false bottom 9 of the same contour as the floor of the receptacle, but of slightly smaller dimensions, rests upon the upper edge of the lever 7 and is secured rigidly thereto, and is movable with said lever. At the outer end of the lever 7 a flat metal arm 10 is pivotally attached thereto by a pivot pin 11, the arm 10 extending upwardly in a diagonal direction with its upper, slightly curved end 12 resting slidably against the wall 1. Near the upper end of the arm 10 it is partially surrounded by a guide member 13, which projects outwardly from the wall 1 and is attached thereto.

Figure 2:
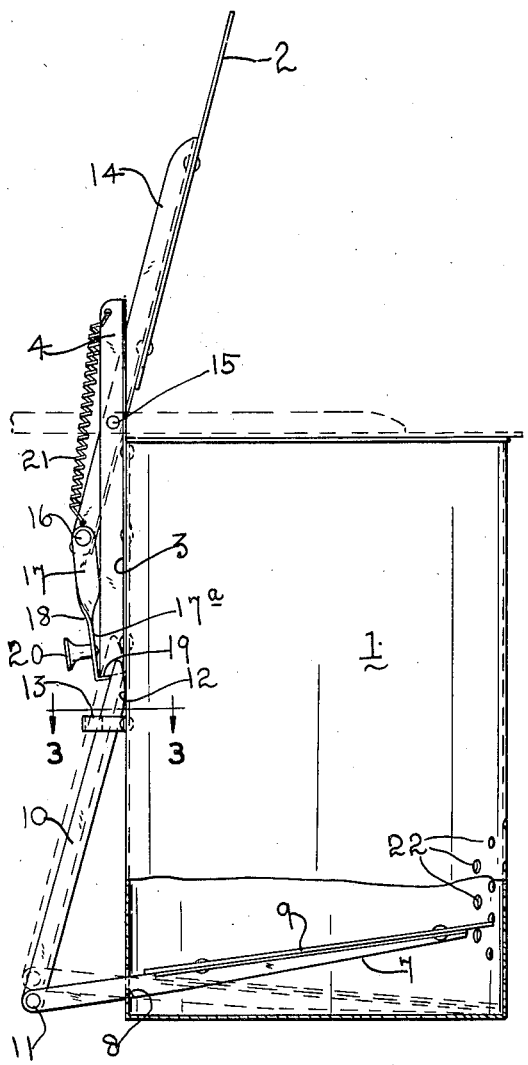
Fig. 2 is a side elevation partially in section of the trap showing it in full lines in set position and in dash lines in sprung position.
Figure 3:
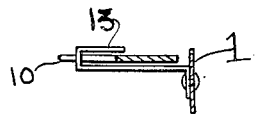
Fig. 3 is an enlarged detail view, partly in section, taken on line 3—3, Fig. 2.

The cover 2 is attached to a flat metal strip 14, which strip is pivotally attached, as at 15, to the flange 3 of the metal member previously referred to at a point immediately above the wall 1. In set position as shown in Fig. 2 the strip 14 extends outwardly beyond the wall 1, and at its lower end said strip 14 is pivotally attached, as at 16, to a flat metal element 17 which is twisted at 18 so as to present a flat surface for engagement with the strip 14 by the pivot pin 16, and the lower portion 17ª of said flat metal element presents a flat face toward the wall 1. At its lower extremity the portion 17ª is bent to provide a hook 19, and an operating knob 20 is attached to the outer face of the portion 17ª, and a coil spring 21 connects the lower extremity of the strip 14 with the upper end of the flange 4, said coil spring being in expanded condition when the trap is set as shown most clearly in Fig. 2.

In operation the procedure is as follows:

Supposing the trap is in its sprung condition and is to be set. In sprung condition, as shown in Fig. 2 in dash lines, the metal strip 14 and attached cover 2 are horizontally disposed on the top of the wall 1, closing the receptacle, and in this position the metal element 17 is suspended from the flat strip 14 and hangs loosely on the pivot 16, and the spring 21 is in its contracted condition. The operator pushes down the arm 10, which movement by virtue of the pivot 11 also pushes down the outer end of the lever 7, and this, by reason of the rocking motion of said lever in the slit 6, raises that portion of said lever which is inside the receptacle and also the false bottom 9, so that the lever and the false bottom are in the position shown in full lines in Fig. 2.

Grasping the knob 20, the operator exerts a downward pull on the metal member 17 until he can catch the hook 19 under the lowermost edge of the flange 4 and in gripping engagement with the outer edge of the arm 10. This downward pull has the effect of drawing the spring 21 to its expanded condition, so that its upward pull on the pivoted end of the metal strip 14 and consequently on the element 17—17ª acts to retain the hook 19 in the engagement previously described with the flange 4 and the arm 10. It is to be understood that this engagement is delicate, and all of the parts are now in the set position shown in Fig. 2 in full lines.

Bait (not shown) is placed on the false bottom 9. It is a well known fact that animals will jump into a receptacle to reach food, and as the animal jumps down upon the false bottom 9 its weight will bring said bottom and the lever 7 to the position shown in dash lines in Fig. 2, by reason of the rocking motion of said lever. Obviously, this results in upward movement of the outer end of said lever and consequently of the arm 10 pivoted thereto, with the further result that said arm in its upward motion is released from gripping engagement with the hook 19, and by reason of its diagonal position, pushes the hook out of engagement with the flange 4, during which operation the member 13 guides said arm 10 in a vertical direction.

The movement just described releases the element 17—17ª, and consequently the pull on the spring 21 is released and it returns to its contracted condition, which has the effect of pulling up the pivoted end of the strip 14 and permitting said strip and the attached cover 2 to drop to the horizontal position shown in dash lines in Fig. 2, which closes the trap with the animal inside the receptacle. The spring 21 is powerful enough to prevent the cover 2 from being pushed up by the trapped animal.

It will be noted in Fig. 2 that the wall 1 is provided with a plurality of apertures 22, the purpose of which is to permit extermination of the trapped animal by immersing the receptacle in water which will enter through said apertures.

I claim:

1. A trap including a receptacle having a wall, a floor, and a cover, said wall being provided with a slit, an element rockable within said slit and a false bottom secured to said rockable element, an upwardly extending diagonal member pivotally connected to said rockable element, a flanged member secured to the outer surface of said wall in alinement with said slit, a support for said cover, a hooked element pivotally suspended from said cover-support and adapted to engage the flanged member and said diagonal member when the trap is set, and a coil spring connecting said flanged member and said cover support and adapted to retain said cover in raised position when said trap is set, said rockable element and false bottom being adapted, upon entry of an animal into said receptacle, to free said hooked element and thereby operate said cover to close the trap.

2. A trap including a receptacle having a wall, a floor, and a cover, said wall being provided with a slit, a rockable element positioned within said slit and partly within and partly outside of said receptacle, a false bottom within said receptacle and secured to said rockable element, an upwardly extending diagonal strip pivotally connected to the outer end of said rockable element and having its upper end resting slidably against said wall, a guide for said diagonal strip, a flanged member secured to the outer surface of said wall in alinement with said slit, a support for said cover, a hooked element pivotally suspended from said cover-support and adapted to engage the flanged member and said diagonal strip when the trap is set, and a coil spring connecting the upper end of said flanged member and the lower end of said cover-support, said coil spring being in retracted condition to retain said cover in open position when the trap is set, all of said parts being in such relation to each other that, upon entry of an animal into said receptacle, the impact of said animal upon said false bottom raises the outer end of said rockable element and the diagonal strip pivoted thereto to free said hooked element and thereby release said cover to close said receptacle through contracting action of said coil spring.

HENRY W. EGGERING.

REFERENCES CITED

The following references are of record in the file of this patent:

UNITED STATES PATENTS

| Number | Name | Date |
| --- | --- | --- |
| 1,453,615 | Bauman | May 1, 1923 |
| 1,797,685 | Hastings | Mar. 24, 1931 |